United States Patent
Meringer et al.

(10) Patent No.: US 11,645,927 B2
(45) Date of Patent: May 9, 2023

(54) PREDICTIVE FLIGHT DIVERSION MANAGEMENT

(71) Applicant: THE BOEING COMPANY, Chicago, IL (US)

(72) Inventors: Anna Meringer, Gdansk (PL); Jonasz Rudnik, Gdansk (PL); Piotr Mazur, Gdansk (PL); Jakub Dziecielski, Gdansk (PL)

(73) Assignee: THE BOEING COMPANY, Arlington, VA (US)

( * ) Notice: Subject to any disclaimer, the term of this patent is extended or adjusted under 35 U.S.C. 154(b) by 177 days.

(21) Appl. No.: 16/518,092

(22) Filed: Jul. 22, 2019

(65) Prior Publication Data
US 2021/0027640 A1    Jan. 28, 2021

(51) Int. Cl.
*G08G 5/00* (2006.01)
*G06Q 10/06* (2012.01)

(52) U.S. Cl.
CPC ........... *G08G 5/0095* (2013.01); *G06Q 10/06* (2013.01); *G08G 5/0008* (2013.01); *G08G 5/0039* (2013.01); *G08G 5/0056* (2013.01); *G08G 5/0091* (2013.01)

(58) Field of Classification Search
CPC .. G08G 5/0095; G08G 5/0008; G08G 5/0039; G08G 5/0056; G08G 5/0091; G08G 5/0013; G08G 5/0021; G08G 5/0026; G08G 5/0043; G08G 5/0082; G06Q 10/06; G06Q 10/04; G06Q 50/30; G06N 5/003; G06N 7/005; G06N 20/20
See application file for complete search history.

(56) References Cited

U.S. PATENT DOCUMENTS

| | | | |
|---|---|---|---|
| 8,666,649 B2 | 3/2014 | Otto et al. | |
| 9,076,327 B1* | 7/2015 | Baiada | G08G 5/0043 |
| 2012/0218127 A1* | 8/2012 | Kroen | G08G 5/006 |
| | | | 340/945 |
| 2013/0179059 A1* | 7/2013 | Otto | G06Q 50/30 |
| | | | 701/120 |
| 2016/0335567 A1* | 11/2016 | Petersen | G06Q 50/30 |
| 2018/0102056 A1* | 4/2018 | Leber | G08G 5/0043 |

(Continued)

OTHER PUBLICATIONS

Zhang, Xiaoge, and Sankaran Mahadevan. "Aircraft re-routing optimization and performance assessment under uncertainty." Decision Support Systems 100.96 (2017): 67-82. (Year: 2017).*

(Continued)

*Primary Examiner* — Aniss Chad
*Assistant Examiner* — Christopher George Fees
(74) *Attorney, Agent, or Firm* — Patterson + Sheridan, LLP

(57) ABSTRACT

The present disclosure provides predictive flight diversion management by: receiving weather data for a zone of air traffic control; receiving flight tracking data for a plurality of aircraft travelling in the zone of air traffic control; determining capacity rates for a plurality of airports in the zone of air traffic control, based on the flight tracking data; and in response to receiving a diversion trigger from a predictive model predicting a diversion event: determining, based on the weather data, the flight tracking data, and the capacity rates, a subset of aircraft from the plurality of aircraft that are to be diverted from original destinations in the zone of air traffic control to new destinations.

20 Claims, 7 Drawing Sheets

(56) References Cited

U.S. PATENT DOCUMENTS

| | | | |
|---|---|---|---|
| 2018/0144643 A1* | 5/2018 | Moravek | G08G 5/0021 |
| 2018/0322793 A1* | 11/2018 | Huang | G08G 5/0013 |
| 2019/0057327 A1* | 2/2019 | Arguello | G06N 7/005 |
| 2019/0147748 A1 | 5/2019 | Boozarjomehri et al. | |
| 2019/0204101 A1* | 7/2019 | Macrae | G06Q 50/30 |

OTHER PUBLICATIONS

European Patent Office Extended European Search Report for Application No. 20186650.6-1203 dated Dec. 12, 2020.

\* cited by examiner

PREDICTIVE FLIGHT DIVERSION MANAGEMENT

FIELD

Aspects of the present disclosure relate to flight management. More particularly, the present disclosure is related to Artificial Intelligence systems using real-time data to predict and manage flights diverting from original flight plans.

BACKGROUND

A diversion refers to a change in a flight plan that affects the destination of the flight (i.e., where and when the aircraft actually lands). For example, an aircraft originally destined for airport A may divert to airport B when airport A is experiencing inclement weather, is experiencing runway congestion, etc., or when the aircraft is low on fuel, when technical difficulties occur, when a person on board the aircraft is experiencing a medical issue, etc. Whether an event affects multiple aircraft (e.g., a diverting event at an airport or along a flight corridor) or a single aircraft, the diverted aircraft, its passengers, cargo, and crew need to be received and processed by the new destination, which may affect the other aircraft destined for that airport (either originally or due to a diversion), which can cascade into further delays or secondary diversions. Conventionally, aircraft dispatchers have therefore resorted to instructing aircraft not experiencing any issues enter a holding pattern (e.g., to circle an original destination airport) until a diverting event affecting that destination airport ends in order to reduce the number of diversions. Unfortunately, this conventional practice creates additional complexities in the greater air traffic system and results in negative passenger experiences, increased wear on aircraft, increased crew fatigue, and other issues.

SUMMARY

The present disclosure provides a method for predictive flight diversion management in one aspect, the method including: receiving weather data for a zone of air traffic control; receiving flight tracking data for a plurality of aircraft travelling in the zone of air traffic control; determining capacity rates for a plurality of airports in the zone of air traffic control, based on the flight tracking data; and in response to receiving a diversion trigger from a predictive model predicting a diversion event: determining, based on the weather data, the flight tracking data, and the capacity rates, a subset of aircraft from the plurality of aircraft that are to be diverted from original destinations in the zone of air traffic control to new destinations.

In one aspect, in combination with any example method above or below, the method further includes: transmitting an alert to a flight dispatcher for the zone of air traffic control indicating the subset and corresponding candidate new destinations for each aircraft in the subset; and in response to receiving a selection of a given candidate new destination for a given aircraft of the subset, updating the capacity rates for the plurality of airports and removing the given aircraft from the subset.

In one aspect, in combination with any example method above or below, the zone of air traffic control includes global flight operations.

In one aspect, in combination with any example method above or below, the plurality of airports from which the new destinations are selected comprise a designated subset of the plurality of airports that satisfy operator requirements, including one or more of: proximity to a current flight route; repair services offered; medical services offered; and alternative flights offered by a given aircraft operator.

In one aspect, in combination with any example method above or below, the new destinations are selected from the plurality of airports based on: predicted weather conditions at predicted times of arrival for a given aircraft of the subset each of the new destinations; and predicted capacity rate for each of the new destinations at an associated predicted time of arrival for the given aircraft.

In one aspect, in combination with any example method above or below, determining the capacity rates for the plurality of airports in the zone of air traffic control, based on the flight tracking data, further comprises: obtaining operating parameters for the plurality of airports, including a quantity of active runways, a quantity of active terminals, and a quantity of hangar berths present at a given airport; observing flight tracking data over a predetermined time period to determine: a number of active runways in use at an Estimated Time of Arrival (ETA) for a particular aircraft of the subset to the given airport compared to the quantity of active runways; a number of active terminals in use at the ETA compared to the quantity of active terminals; and a number of hangar berths in use at the ETA compared to the quantity of hangar berths.

In one aspect, in combination with any example method above or below, the flight tracking data include: an original flight path, including an original origin and an original destination; deviation information from the original flight path; and current location information for an associated aircraft of the plurality of aircraft.

In one aspect, in combination with any example method above or below, each aircraft of the subset is iteratively assigned selected candidate new destinations, wherein the candidate new destinations recommended to each aircraft of the subset are updated as the aircraft of the subset are assigned to the selected candidate new destinations.

In one aspect, in combination with any example method above or below, the flight tracking data are Automatic Dependent Surveillance-Broadcast (ADS-B) data.

The present disclosure provides a system in one aspect, a system for predictive flight diversion management including: a processor; and a memory storage device including instructions that when executed by the processor provide: a diversion prediction module, configured to determine diversion likelihoods for each aircraft of a plurality of aircraft diverting to a new destination airport based on weather data and flight tracking data for the plurality of aircraft; a disruption prediction module, configured to determine a disruption likelihood for each airport of a plurality of airports being disrupted by diverting aircraft of the plurality of aircraft to an individual airport based on the weather data, the flight tracking data, airport operating conditions, and the diversion likelihoods; and a recommendation module, configured to output a predefined number of candidate airports with lowest disruption likelihoods for each aircraft of the plurality of aircraft.

In one aspect, in combination with any example system above or below, the instructions when executed by the processor further provide: an Estimated Time of Arrival (ETA) prediction module, configured to determine ETAs for each aircraft diverting each candidate new destination identified by the diversion prediction module based on the weather data and the flight tracking data.

In one aspect, in combination with any example system above or below, the diversion prediction module includes: a diversion detection model, trained to predict when a given aircraft is to be diverted from an original destination based on the weather data, the flight tracking data, and the airport operating conditions; and a new destination prediction model, trained to identify candidate airports to divert the given aircraft to based on the flight tracking data and airport operating conditions.

In one aspect, in combination with any example system above or below, the recommendation module transmits an alert to a flight dispatcher associated with a given diverted aircraft that identifies the predefined number of candidate airports, and is further configured to receive a selection of a given candidate airport from the flight dispatcher; and in response to receiving the selection, update the airport operating conditions based on the selection.

In one aspect, in combination with any example system above or below, the recommendation module includes a plurality of alternative selection models corresponding in number to the predefined number of candidate airports, wherein each alternative selection model is a machine learning model trained to identify one candidate airport with a lowest disruption likelihood using a different prioritization than other alternative selection models of the plurality of alternative selection models.

The present disclosure provides a computer readable storage device embodying instructions for predictive flight diversion management in one aspect, wherein when the instructions are executed by a processor, enable the processor to perform an operation including: receiving weather data for a zone of flight control; receiving flight tracking data for a plurality of aircraft travelling in the zone of flight control; in response to receiving a diversion trigger affecting a first airport: identifying, based on the weather data, the flight tracking data, and a capacity rate for the first airport, a first aircraft from the plurality of aircraft that is originally destined for the first airport is to be diverted; in response to determining that a predicted capacity rate for a second airport in the zone of flight control, based on the flight tracking data, satisfies a capacity threshold, diverting the first aircraft to the second airport from the first airport; updating the flight tracking data to indicate that the first aircraft is diverted from the first airport to the second airport; and updating the capacity rate for the second airport based on the flight tracking data as updated.

In one aspect, in combination with any example computer readable storage device above or below, the diversion trigger is received from a predictive model in response to the predictive model predicting a diversion event affecting the first airport based on the weather data and the flight tracking data.

In one aspect, in combination with any example computer readable storage device above or below, the diversion trigger is received from an aircraft operator in response to a manually reported mechanical or medical issue on the first aircraft.

In one aspect, in combination with any example computer readable storage device above or below, the second airport is selected from a subset of airports in a zone of flight control that satisfy operator requirements including one or more of: proximity to a current flight route; repair services offered; medical services offered; and alternative flights offered by a given aircraft operator.

In one aspect, in combination with any example computer readable storage device above or below, the second airport is selected based on: predicted weather conditions at the second airport at a predicted time of arrival for the first aircraft at the second airport; and predicted capacity rates of the second airport at the predicted time of arrival for the first aircraft for resources consumed by the first aircraft.

In one aspect, in combination with any example computer readable storage device above or below, determining the predicted capacity rate for the second airport, further comprises: observing flight tracking data over a predetermined time period to determine: a number of active runways in use at an Estimated Time of Arrival (ETA) for the first aircraft to the second airport compared to a quantity of active runways; a number of active gates in use at the ETA compared to a quantity of active gates; and a number of hangar berths in use at the ETA compared to a quantity of hangar berths.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to systems and methods for predictive flight tracking and management, using flight tracking data (e.g., ADS-B (Automatic Dependent Surveillance-Broadcast) data), airport operational data, and weather data in real-time to predict and manage flight diversions from initial destinations to new destinations. Artificial Intelligence (AI) models trained on historical flight diversion data and provided with real-time data from flight tracking and transponder systems (such as ADS-B systems), weather tracking systems (e.g., METAR (Meteorological Aerodrome Reports), Terminal Aerodrome Forecasts (TAF)), and operators (e.g., airline operating instructions, aircraft capabilities, airport capabilities) to predict when a flight is expected to require a diversion and to proactively recommend a diversion destination for that flight.

By gathering data in real-time from many flights, an understanding of the real-time operations of individual airports relative to the capacities of those airports may be established, which allows a dispatcher to divert aircraft sooner and with fewer delays or secondary diversions, and with fewer communications between ground personnel and individual aircraft. Accordingly, practitioners of the present disclosure may expect reduced airport congestion, reduced aircraft hold/linger time, and reduced communications volumes to implement diversions (e.g., Air Traffic Control (ATC) radio traffic). Practitioners may also realize fuel savings, increased passenger satisfaction, and reduced sequential disruptions (e.g., missed connecting flights, re-homing of diverted aircraft and crews, and secondary transportation for passenger).

Figure 1:
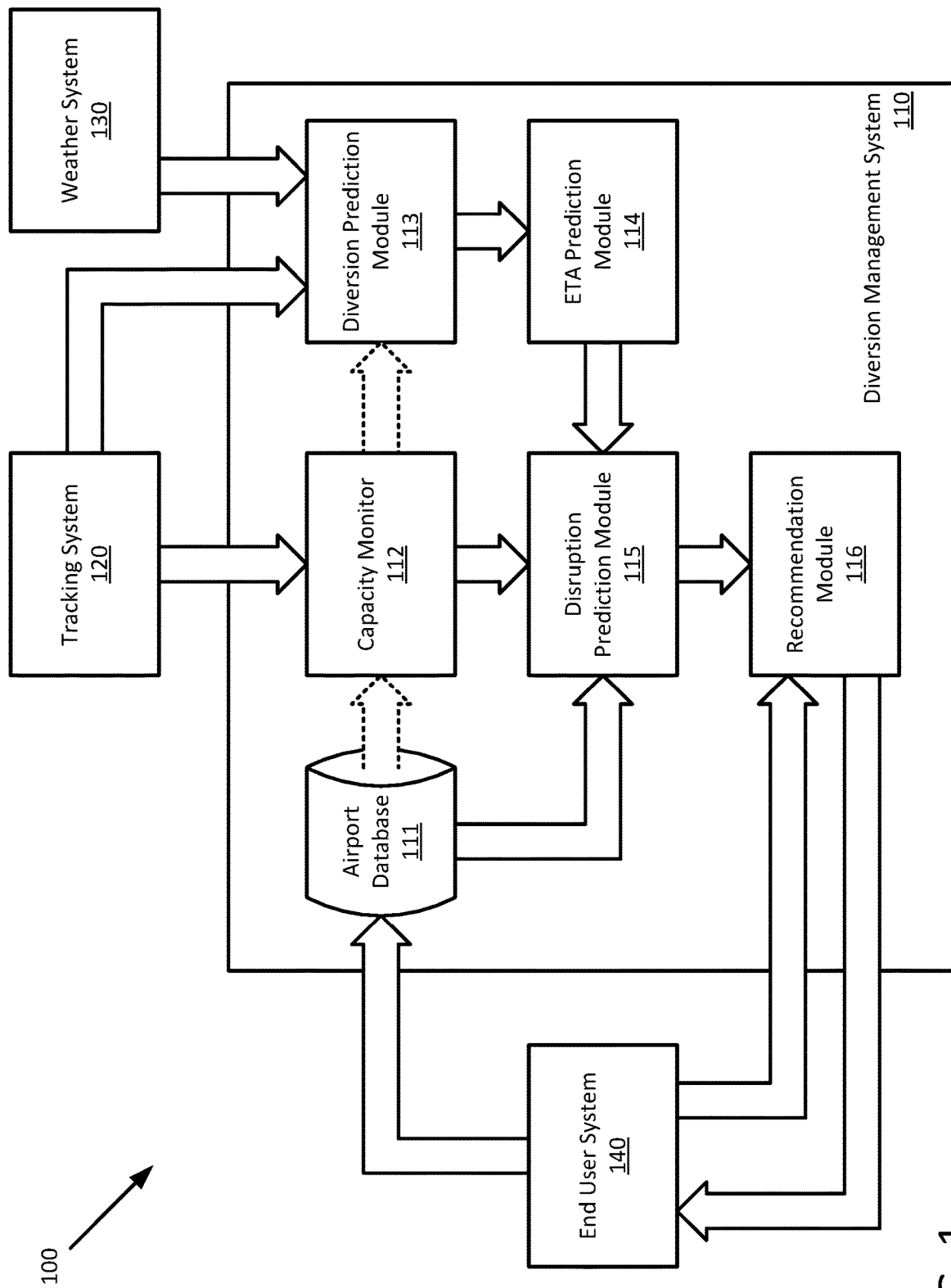
FIG. 1 illustrates a diversion prediction environment, according to aspects of the present disclosure.

FIG. 1 illustrates a diversion prediction environment 100, according to aspects of the present disclosure. A diversion management system 110 is provided on a computing device, (such as a computing device 700, which is discussed in greater detail herein in regard to FIG. 7) to proactively manage flights predicted to be at risk for diversion. The diversion management system 110 is in communication with a tracking system 120, a weather system 130, and an end-user system 140, which may be included on the same computing device as the diversion management system 110 and/or one another, or on separate computing devices. Additionally, although illustrated as individual systems, each of the diversion management system 110, tracking system 120, weather system 130, and end-user system 140 may represent one or a plurality of individual systems of the indicated type which may be provided by an individual computing device or by a distributed computing environment. When provided by separate devices, the various systems are communicatively connected to one another by one or more of a wireless or wired network, broadcast services, and beamed services (e.g., directed satellite communication and microwave point-to-point communications).

The tracking system 120 provides flight tracking data from various aircraft in a zone of aircraft control for the diversion management system 110. In various aspects, the tracking data may include ADS-B data, radar positioning data, transponder data, and other data that indicate where an aircraft is located (including altitude), the heading of the aircraft, and the speed at which the aircraft is traveling. For ADS-B data, the individual aircraft receive satellite positioning information to determine where that aircraft is currently located and the current velocity of that aircraft, which the individual aircraft broadcast for reception by one or more tracking systems 120.

In various aspects, the tracking system 120 receives the flight tracking data from all of the transmitting aircraft in the zone of aircraft control by various receivers at various geographic locations, which are then collated into a single dataset to observe the flight paths of all of the aircraft in the zone of aircraft control. In various aspects, the zone of aircraft control is global (i.e., includes the tracking data for all actively transmitting or tracked aircraft), but may also be localized (e.g., all active/transmitting aircraft within a determined range of an airport or other navigational feature, within a country's airspace, within a region, etc.). In some aspects, the tracking data further identifies the particular aircraft (e.g., flight X operated by airline A), the type of aircraft and the operator of the aircraft, which the diversion management system 110 can correlate to known aircraft characteristics (e.g., carries X passengers, requires a runway at least Y m long, uses facilities in general aviation or associated with airline A or C (but not B)), the origin and destination (and any known waypoints) for the current (or original) flight plan for the aircraft, etc. These flight tracking data may further provide deviation data from the original flight plan; indicating to what extent the aircraft is off course (including flying at a different altitude than originally planned), ahead or behind of schedule, flying faster or slower than originally planned, or being directed to a different destination than originally planned.

The weather system 130 receives current weather data and weather forecast data (collectively, weather data) correlated to various locations in the zone of flight control. In various aspects, the weather data include METAR (Meteorological Aerodrome Reports) data, Terminal Aerodrome Forecasts (TAF) data, and other current, short-term, or long-term sets of information related to localized weather. The weather data may indicate one or more of: temperature; humidity; wind speed; chance of, amount of, and type of precipitation (e.g., rain, snow, hail); chance of lightning; and ground based conditions that may affect air patterns (e.g., volcanic eruptions, forest fires, floods), to name a few examples.

The end-user system 140 represents the computing systems of one or more flight dispatchers or aircrews (e.g., pilots, copilots, navigators, etc.). Flight dispatchers include Air Traffic Controllers (ATC), airport operators, and ground-based airline operators who have control over whether and where an aircraft is diverted.

The end-user systems 140 can indicate to the diversion management system 110 various requirements or reasons behind a diversion, and the various amenities and facilities at or near each airport. For example, a Fixed Base Operator (FBO) at a given airport may periodically update an airport database 111 with the conditions and services available at an associated airport. In another example, a fight controller for an airline may indicate that a given aircraft needs to be diverted due to a medical issue or technical issue on the aircraft so that the diversion management system 110 will recommend airports to divert to with appropriate resources to resolve the issue (e.g., medical or maintenance teams and facilities at or nearby the selected airport). The diversion management system 110, in turn, uses the received flight tracking data, weather data, knowledge of the airports in the airport database 111, and needs indicated by the end-user system 140 (if indicated), to determine one or more "best" airports to divert a given aircraft to, which are provided in a recommendation or alert to the end-user system 140 to select as the new destination for a flight.

To determine which airports are the "best" for a given potential diversion, the diversion management system 110 uses the received data to develop a holistic view of the current flight situation in a zone of aircraft control, such as by identifying where all of the aircraft are located and headed, identifying what resources remain available at each airport, and predicting how the aircraft and airports interact over time in view of the operations of those aircraft and airports.

The diversion management system 110 includes an airport database 111 that identifies what resources (e.g., number and lengths of runways, numbers and types of gates/terminals, maintenance facilities, fuel capacity, hangar space, customs stations) are available at each airport, and what services are located nearby each airport (e.g., ground transportation options, lodging options, medical services), and where each airport is located. End users may update, or a provider of the diversion management system 110 may curate, the airport database 111 to reflect the most recent conditions for one or more airports (e.g., when a new runway is opened, when a terminal is closed for remodeling).

In some aspects, a capacity monitor 112 receives the information about each airport from the airport database 111 and the flight tracking information from the tracking system 120 to determine a capacity rate for various metrics for the airports, such as, for example, the percentage of runways in use, the percentage of gates occupied by aircraft, the usage rate of the maintenance crews at the airport, etc., based on what aircraft arrived at what times from the flight tracking data received over time. The capacity monitor 112 provides an up-to-date data set of the airport operating conditions at each airport in the zone of flight control that indicate what services and resources are nominally available and what services are resources are expected to be in use or otherwise unavailable to incoming aircraft.

A diversion prediction module 113 receives the weather data, flight tracking data, and (optionally) the capacity rates of the airports to determine when an aircraft is likely to be diverted and what airports that aircraft is likely to be diverted to. An Estimated Time of Arrival (ETA) prediction module 114 determines what the ETAs are for aircraft that are determined to be likely to be diverted to each of the candidate airports identified by the diversion prediction module 113. For example, when a diversion is predicted at airport A that affects aircraft X destined for airport A, the diversion prediction module 113 identifies airports B and C as candidate new destinations for aircraft X, and the ETA prediction module 114 can then determine the ETAs for aircraft X to airports B and C.

The disruption prediction module 115 receives capacity rates from the capacity monitor 112, the ETAs at the candidate airports from the ETA prediction module 114, the tracking data, and the weather data to determine to what extent a diversion will disrupt operations at the airports.

For example, if airport B is able to handle an additional n aircraft in the next hour but n+m aircraft are being diverted to airport B, airport B will experience disruptions and/or secondary diversions may be required (e.g., aircraft X is diverted to airport B and is later diverted to airport C). The disruption prediction module 115 therefore provides these predictions to the recommendation module 116.

The recommendation module 116 ingests the requirements and preferences of the aircraft operators, the known and predicted destinations of all of the aircraft currently in the zone of aircraft control, and predicted disruption risks for all of the available airports in the zone of aircraft control, and determines which airports are the "best" diversion destinations for the collective aircraft that are predicted to be affected by the diversion event. For example, although aircraft X and aircraft Y may both be diverted from airport A to either airport B or airport C due to the same diversion event, the recommendation module 116 may recommend that aircraft X to be diverted to airport B and aircraft Y to be diverted to airport C. When recommending which airports individual aircraft are diverted to, the recommendation module 116 weighs the preferences of the aircraft operators and the disruption to the total air traffic network (e.g., to not overwhelm a given airport) to identify to a flight dispatcher one or more preferred airports to divert a given aircraft to in response to a diversion event. The recommendation module 116 also considers the requirements of the individual aircraft, for example, if aircraft X requires a sufficiently long runway, sufficiently large gateway parking spot or other berth, a customs checkpoint, or other resource that airport B lacks, the recommendation module 116 will not recommend that aircraft X be diverted to airport B.

By predicting a diversion event instead of waiting for the event to occur, the diversion management system 110 can select from a greater number of airports to divert an aircraft to, and divert those aircraft sooner, which beneficially results in passengers reaching intended destinations sooner, flight crews being on-duty for less time, less stress on mechanical systems, less fuel consumption, etc.

By monitoring all of the aircraft and the airports in the zone of flight control, the diversion management system 110 can spread and thereby mitigate the effects of a diversion event (predicted or currently occurring) from the affected airport over the zone of flight control. For example, when a diversion event (e.g., a thunderstorm) causes flights originally destined for airport A to be diverted, the diversion management system 110 can identify airports en route (i.e., within a predefined distance of the current flight path) for the various aircraft bound for airport A, and spread the aircraft among the new destinations to thereby reduce the risk of disruption to any individual new destination and to the passengers and crew aboard the aircraft. To select the new destinations as early as possible and thereby reduce disruption for passengers, airlines, and airports, the diversion management system 110 trains several Artificial Intelligence (AI) models to predict the diversion events as early as possible.

Figure 2:
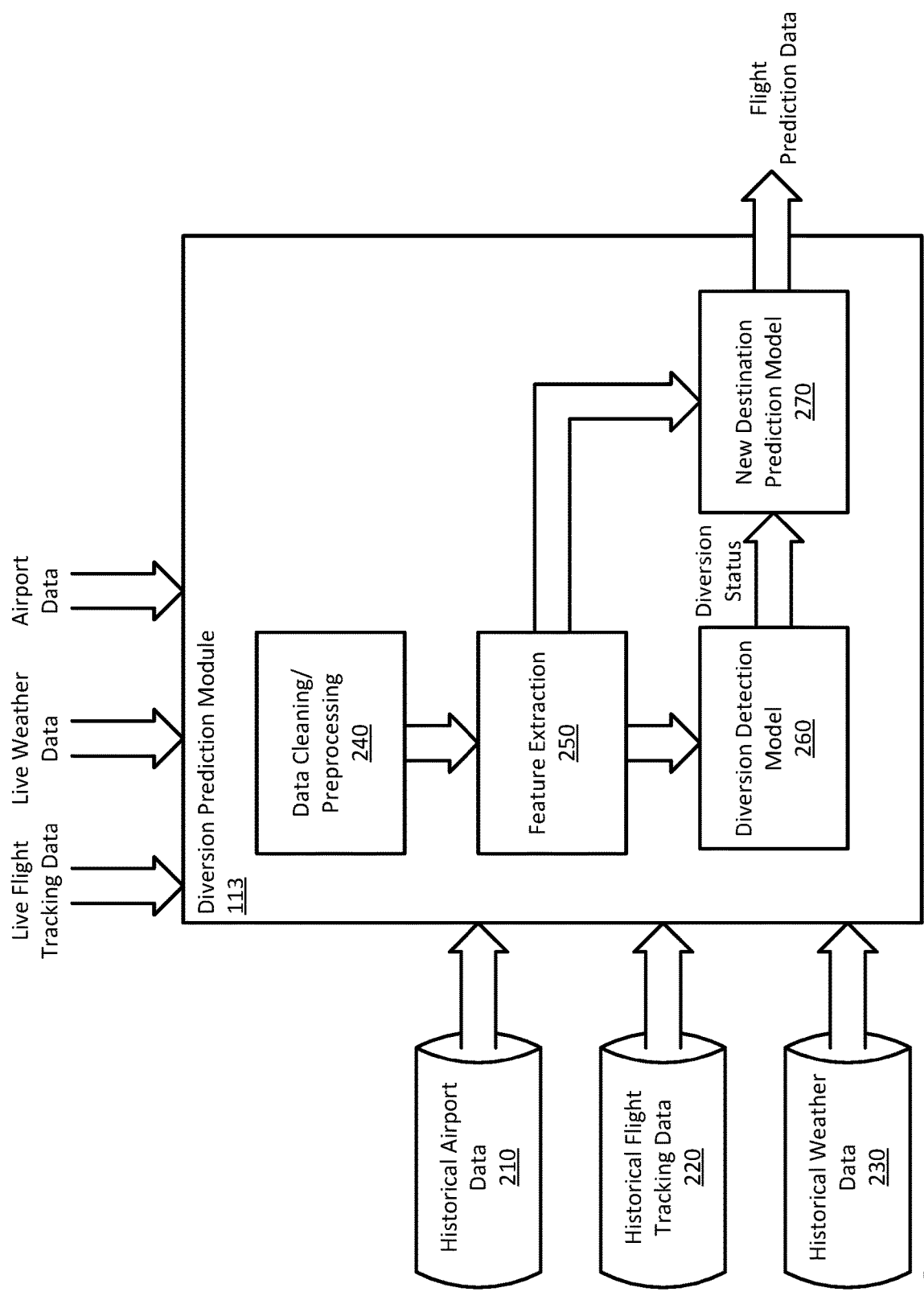
FIG. 2 illustrates a detailed view of the diversion prediction module, according to aspects of the present disclosure.

FIG. 2 illustrates a detailed view of the diversion prediction module 113, according to aspects of the present disclosure. When active, the diversion prediction module 113 may receive, for example, airport data, weather data, and flight tracking data to produce flight prediction data that indicate a prediction of whether a given flight will be diverted and what airports that flight will be diverted to (if diverted). In various aspects, the diversion prediction module 113 uses the most up-to-date data available for the live data, such as when a data feed is interrupted. The flight prediction data indicate a diversion likelihood that exceeds a predefined likelihood threshold, and that a given aircraft should be directed to land at a different airport than the flight plan originally indicated. A data cleaning/preprocessing module 240 standardizes and establishes a mutual relation between the received data to produce a dataset of a standardized format and time/location signature so that data received for different or offset locations and/or times can be compared to one another. Accordingly, data related to a first geographical region and a second geographical region that are noncontiguous or partially contiguous and/or data received at different rates and/or different times can be combined together to provide a coherent and standardized data set for later analysis.

A feature extraction module 250 identifies portions of the dataset that are used by the AI models to identify and predict whether a flight will be diverted and, if so, to what diversion destination. For the diversion detection module 260, the feature extraction module 250 extracts one or more of: a trajectory shape for the flight plan for an aircraft, a distance and angle to the current destination for an aircraft, weather, a number of flights currently holding at an airport, the origin of an aircraft, an altitude of an aircraft, a location of an aircraft, and a heading of an aircraft. For the new destination prediction model 270, the feature extraction module 250 extracts one or more of: a trajectory shape for an aircraft, a distance and angle to the original destination, weather, a number of flights currently holding at an airport, the origin of an aircraft, an altitude of an aircraft, a location of an aircraft, and a heading of an aircraft.

Data cleaning/preprocessing and feature extraction are used on live data as well as on training data of historical airport data 210, historical flight tracking data 220, and historical weather data 230. The historical flight tracking data 220 provide a supervised learning set; indicating whether a given aircraft in the historical data was diverted and to which airport. The diversion prediction module 113 trains the AI models based on the supervised learning set, for example, by a random forest method that develops and compares several models and selects a most accurate model for use as the diversion detection module 260 and new destination prediction model 270, respectively.

When trained and active, the diversion detection module 260 receives the extracted features to predict whether an aircraft will be diverted before reaching the original destination. The prediction may be output as a classification, such as "divert" or "do not divert", or output as a likelihood determination (e.g., x % likely to divert). During training, the diversion detection module 260 may develop a likelihood threshold for when to generate a diversion trigger (e.g., trigger when the likelihood of diversion exceeds y %), or may use a user-defined likelihood threshold.

When trained and active, the new destination prediction model 270 receives the extracted features from the feature extraction module 250 and the diversion prediction from the diversion detection module 260 to produce flight prediction data, which indicates one or more new destinations for all of the aircraft predicted to be diverted before reaching the original destinations.

Figure 3:
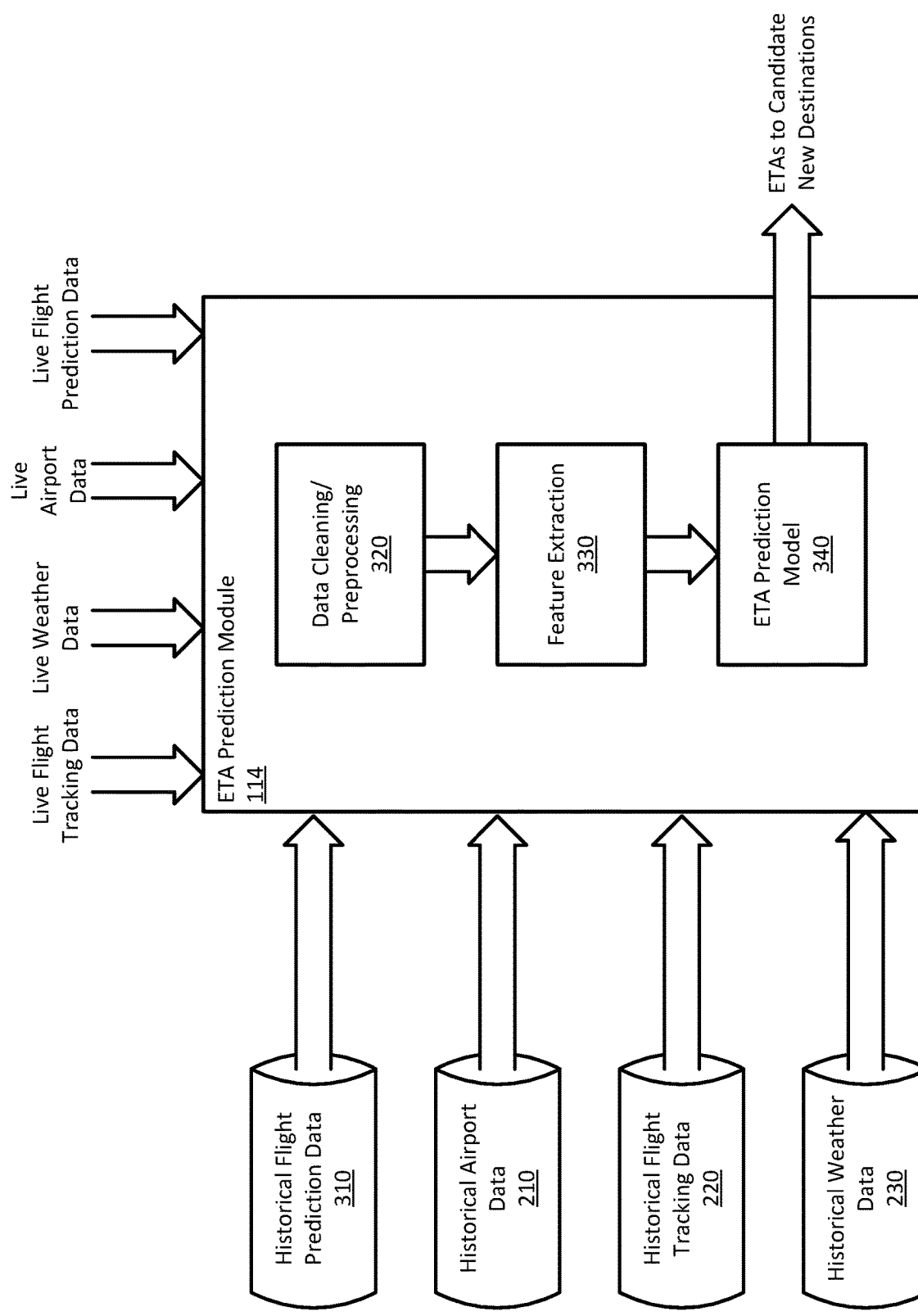
FIG. 3 illustrates a detailed view of the Estimated Time of Arrival prediction module, according to aspects of the present disclosure.

FIG. 3 illustrates a detailed view of the ETA prediction module 114, according to aspects of the present disclosure. When active, the ETA prediction module 114 may receive, for example, live airport data, live weather data, live flight tracking data, and live flight prediction data (from the diversion prediction module 113) to produce ETAs for the predicted diverted aircraft to the candidate new destination(s) identified by the diversion prediction module 113. A data cleaning/preprocessing module 320 standardizes and establishes a mutual relation between the received data to produce a dataset of a standardized format and time/location signature so that data received for different or offset locations and/or times can be compared to one another.

A feature extraction module 330 identifies portions of the dataset that are used by the AI models to identify and predict how long an aircraft will take to reach the candidate new destinations. For the ETA prediction model 340, the feature extraction module 330 extracts one or more of: weather, time of year/week/day, location of the aircraft, distance to the candidate new destination, a speed of the aircraft, an altitude of an aircraft, a heading of an aircraft, and traffic along the route or at the candidate new destination.

Data cleaning/preprocessing and feature extraction are used on live data as well as on training data of historical airport data 210, historical flight tracking data 220, historical weather data 230, and historical flight prediction data 310. The historical flight tracking data 220 provides a supervised learning set, which indicates how long a given aircraft took to actually reach a given destination for the given historical features. The ETA prediction module 114 trains the ETA prediction model 340 based on the supervised learning set, for example, by a random forest method that develops and compares several models and selects a most accurate model for use as the ETA prediction model 340.

When trained and active, the ETA prediction model 340 receives the extracted features to predict how long a given aircraft will take to reach a candidate new destination. The prediction may be output as a time-until-destination reached measurement, which may include a confidence score or error range in the estimated time of arrival at each of the candidate new destinations. The predicted ETAs for the aircraft to reach the candidate new destinations update the live flight prediction data, and may be added to the historical flight prediction data 310 for future training purposes.

Figure 4:
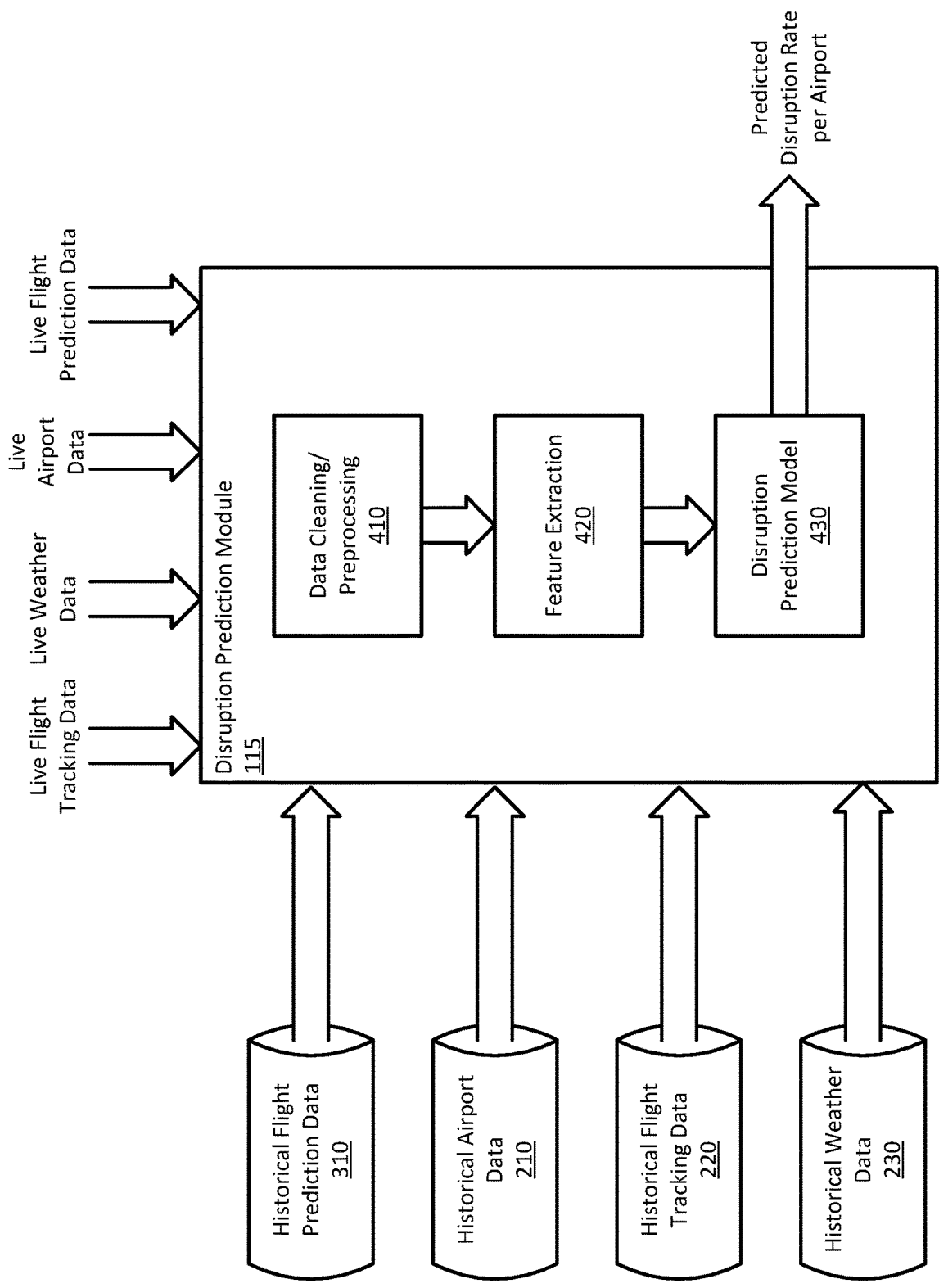
FIG. 4 illustrates a detailed view of the disruption prediction module, according to aspects of the present disclosure.

FIG. 4 illustrates a detailed view of the disruption prediction module 115, according to aspects of the present disclosure. When active, the disruption prediction module 115 may receive, for example, live airport data, live weather data, live flight tracking data, and live flight prediction data (including the predicted ETAs to the candidate destinations from the ETA prediction module 114) to produce predicted disruption rates at each airport in the zone of aircraft control. In some aspects, the disruption prediction module 115 outputs several time-bound disruption predictions for each airport (e.g., a likelihood of disruption within the next h hours, the next 2 h hours, etc.). A data cleaning/preprocessing module 410 standardizes and establishes a mutual relation between the received data to produce a dataset of a standardized format and time/location signature so that data received for different or offset locations and/or times can be compared to one another.

A feature extraction module 420 identifies portions of the dataset that are used by the AI models to identify and predict how much disruption is expected to result at a given airport in the future due to the currently available live data and the predicted diversions. For the disruption prediction model 430, the feature extraction module 420 extracts one or more of: weather, aircraft holding at various airports, diversions (actual and predicted), delays from scheduled flight plans, traffic along the route or at various airports, ETAs for various aircraft (to original and candidate diversion destinations), flight schedules, and aircraft types (e.g., indicting size, number of passenger, amount of cargo, runway requirements, maintenance/fueling/hangar requirements).

Data cleaning/preprocessing and feature extraction are used on live data as well as on training data of historical airport data 210, historical flight tracking data 220, historical weather data 230, and historical flight prediction data 310. The historical flight tracking data 220 provide a supervised learning set, which indicates whether and how severe actual disruptions at individual airports were, which are used to tune the disruption prediction model 430 to predict upcoming disruptions based on the live data. The disruption prediction module 115 trains the disruption prediction model 430 based on the supervised learning set, for example, by a random forest method that develops and compares several models and selects a most accurate model for use as the disruption prediction model 430.

When trained and active, the disruption prediction model 430 receives the extracted features to predict whether a given airport will experience a disruption within an indicated time period, and how severe that disruption will be. The severity of a disruption can include a length of the disruption (including a start and an end time), a confidence in the disruption prediction, resource(s) affected by the disruption, and the like. The individual resources affected by a disruption may be identified based on resource availability, as identified by the capacity monitor 112 of FIG. 1 and the predicted resource consumption for the diverted aircraft.

For example, the disruption prediction model 430 may indicate that a disruption to airports A and B will be resolved after h hours at airport A and after 2 h hours at airport B. In another example, the disruption prediction model 430 may indicate that airport C will be disruption free from the current time $t_0$ until time $t_1$ and will experience a disruption from time $t_1$ to time $t_2$ affecting runways of type x, but will be disruption free from $t_0$ to time $t_2$ on runways of type y. In further aspects, the disruption prediction model 430 may predict the disruption likelihoods and severities of any predicted disruptions for various resources independently of one another. For example, the disruption prediction model 430 may predict that runways capable of receiving aircraft of types X and Y will be disrupted at airport A, but runways capable of receiving aircraft of type X (but not type Y) will not be disrupted at airport A in the same time period.

Figure 5:
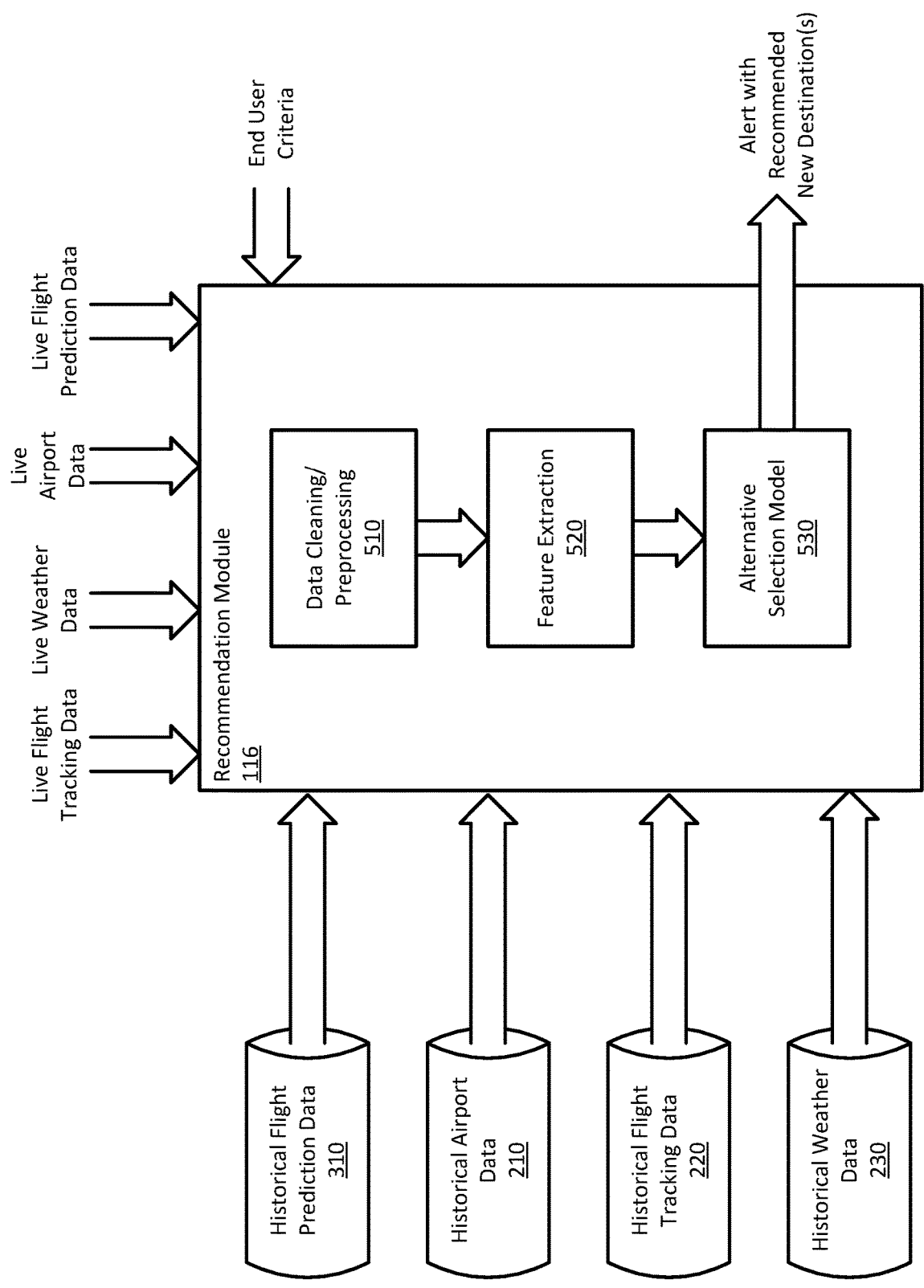
FIG. 5 illustrates a detailed view of the recommendation module, according to aspects of the present disclosure.

FIG. 5 illustrates a detailed view of the recommendation module 116, according to aspects of the present disclosure.

When active, the recommendation module 116 may receive, for example, live airport data, live weather data, live flight tracking data, live flight prediction data (including the disruption predictions from the disruption prediction module 115), and end user criteria to identify one or more candidate airports to divert a given aircraft to in the event of a predicted or indicated diversion event (collectively referred to as a diversion trigger). In various aspects, the end user criteria indicate one or more of: a manually requested diversion (e.g., due to a mechanical or medical issue onboard the aircraft), preferences for the locations of diversion destinations (e.g., the closest destination to the current location, a closest destination to the original destination), preferences for facilities at diversion destinations (e.g.; within a range of a hospital; servicing airlines A, B, or C; types of maintenance facilities present; backup flight crew present), etc. The recommendation module 116 produces an alert with one or more recommended new destinations for an aircraft, which are sent to end-user systems 140 (e.g., a flight computer for the aircraft in question, a dispatcher computer for an airline or an ATC) and can select a new destination for the aircraft to divert to. A data cleaning/preprocessing module 510 standardizes and establishes a mutual relation between the received data to produce a dataset of a standardized format and time/location signature so that data received for different or offset locations and/or times can be compared to one another.

A feature extraction module 520 identifies portions of the dataset that are used by the AI models to identify the "best" diversion destinations for diverting aircraft based on the currently available live data and the predicted diversions. For the alternative selection model 530, the feature extraction module 520 extracts one or more of: weather, aircraft holding at various airports, diversions (actual and predicted), delays from scheduled flight plans, traffic along the route or at various airports, ETAs for various aircraft (to original and candidate diversion destinations), flight schedules, aircraft types (e.g., indicting size, number of passenger, amount of cargo, runway requirements, maintenance/fueling/hangar requirements), levels of disruption (actual and predicted) at various airports, and services offered at or near various airports.

Data cleaning/preprocessing and feature extraction are used on live data as well as on training data of historical airport data 210, historical flight tracking data 220, historical weather data 230, and historical flight prediction data 310. The historical flight tracking data 220 provide a supervised learning set, which indicates which airports were presented to end users for previously predicted diversions and which candidate airports were selected by the end users in response to historical diversions, which are used to tune the alternative selection model 530 to identify airports as candidate diversion destinations in alerts sent to end users based on the live data. The recommendation module 116 trains the alternative selection model 530 based on the supervised learning set, for example, by a random forest method that develops and compares several models and selects a most accurate model for use as the alternative selection model 530.

When trained and active, the alternative selection model 530 receives the extracted features to determine a set of possible alternative airports for the destination for a flight that meet the end user's criteria (e.g., open/available for landing at the ETA, that can handle aircraft of a designated size and number of passengers, services and facilities available). The alternative selection model 530 predicts the conditions at each of the alternative airports at the ETA of the diverting aircraft at the alternative airports to determine which airports can be diverted to with the least disruption to the operation of the airport, the aircraft, and the passengers and/or cargo. For example, an airport that an airline frequently uses (and has associated ground crews, additional flight crews, etc. at that airport) may result in less disruption to the airline in handling later flights with that aircraft. In another example, an airport with the greatest free capacity may accept the diverted aircraft with the least disruption among the candidate airports (e.g., allowing the aircraft to land sooner and for passengers to find alternative transport sooner). In a further example, an alternative airport closest to the original destination airport may result in the least disruption to the passengers or cargo in reaching a final destination via ground transportation.

The alternative selection model 530 weighs the competing interests of airline disruption, airport disruption, and passenger disruption to identify a predefined number of candidate airports as the "best" alternatives to the end user. In some aspects, multiple instances of the alternative selection model 530 provide different weights to how the disruption is minimized to provide a corresponding number of "best" candidate airports according to each instance of the alternative selection model 530. For example, three instances of the alternative selection model 530 provide three "best" candidates by using different weights for how to prioritize reducing the disruption to the airline, airport, and to the passengers, respectively, which are provided to the end-user system 140 in one alert to select from.

In aspects providing multiple instances of the alternative selection model 530, the output of one instance may be the same or different from the output from another instance. For example, a first instance that prioritizes reducing the disruption to the airline and a second instance that prioritizes reducing the disruption to the passengers may both identify airport A as the "best" diversion destination, whereas a third instance that prioritizes reducing the disruption to the airport may identify airport B as the "best" diversion destination.

As new live data are received over time, the alternative selection model 530 may update the recommended destination as diversion events unfold. For example, a recommendation at time $t_0$ based on live data received associated with time $t_0$ may indicate that an aircraft can arrive at an original destination ahead of a weather event, resulting in no alert being generated. However, at time $t_1$, based on new data associated with a later time $t_1$, the alternative selection model 530 may determine that the aircraft now cannot arrive at the original destination ahead of the weather event (e.g., due to the weather cell moving faster or the aircraft moving slower than originally predicted) and therefore should be diverted to alternative airport A. Continuing the example, if at time $t_3$, the aircraft diverted to alternative airport A experiences another diverting event (e.g., a medical or mechanical issue) or conditions related to the original diverting event change, the alternative selection model 530 may identify alternative airport B as an alternative to airport A based on the live data associated with time $t_3$.

Because the diversion management system 110 has situational awareness for the entire zone of flight control (which may include global flight operations), in some aspects, the alternative selection model 530 recommends diversion destinations for aircraft based on the higher priorities of other aircraft in avoiding disruption to the traffic network. For example, if aircraft X and aircraft Y are both destined for airport A, and a thunderstorm is approaching airport A which will allow only one of aircraft X and aircraft Y to land before the weather event occurs, the alternative selection model 530 selects one of aircraft X and Y to divert. In some aspects, aircraft X may be scheduled to land at airport A before aircraft Y, but is diverted because aircraft Y carries more passengers, has stricter requirements for ground facilities (e.g., a customs entry point, a longer runway), has a higher priority diversion type (e.g., low fuel, medical or maintenance issue), has replacement crew waiting at airport A, has passengers to pick up at airport A, or the like.

In another example, when aircraft X and Y can both be diverted to either airport A or airport B, the diversion management system 110 selects diversion destinations that result in a lowest total disruption to the passengers, crew, and airlines of aircrafts X and Y rather than selecting destinations based on individual potentials for disruption. By considering the total disruption rather than an aircraft-by-aircraft or airport-by-airport consideration of disruption, the diversion management system 110 can avoid diverting too many aircraft to a selected diversion destination, and thereby mitigate the risk of secondary diversions or increased delays at the diversion destination.

For example, consider the scenario in which diverting aircraft X or Y airport A would result in lower disruption to the respective passengers, crew, and airlines than diverting either aircraft X or Y to airport B, but airport A can only accept one of aircraft X or Y in a given time window. In this scenario, the diversion management system 110 recommends that aircraft X be diverted to airport B and aircraft Y be diverted to airport A, which results in a lower total disruption to the parties than if both aircraft X and Y were diverted to airport A (or if aircraft X were diverted to airport A and aircraft Y were diverted to airport B).

Accordingly, the diversion management system 110 provides a holistic management approach to the air traffic network, rather than an airport-by-airport or aircraft-by-aircraft management. Although the examples provided herein generally relate to one or two aircraft and one or two airports, a diversion management system 110 may track a zone of flight control with any number of aircraft and airports active therein.

Figure 6:
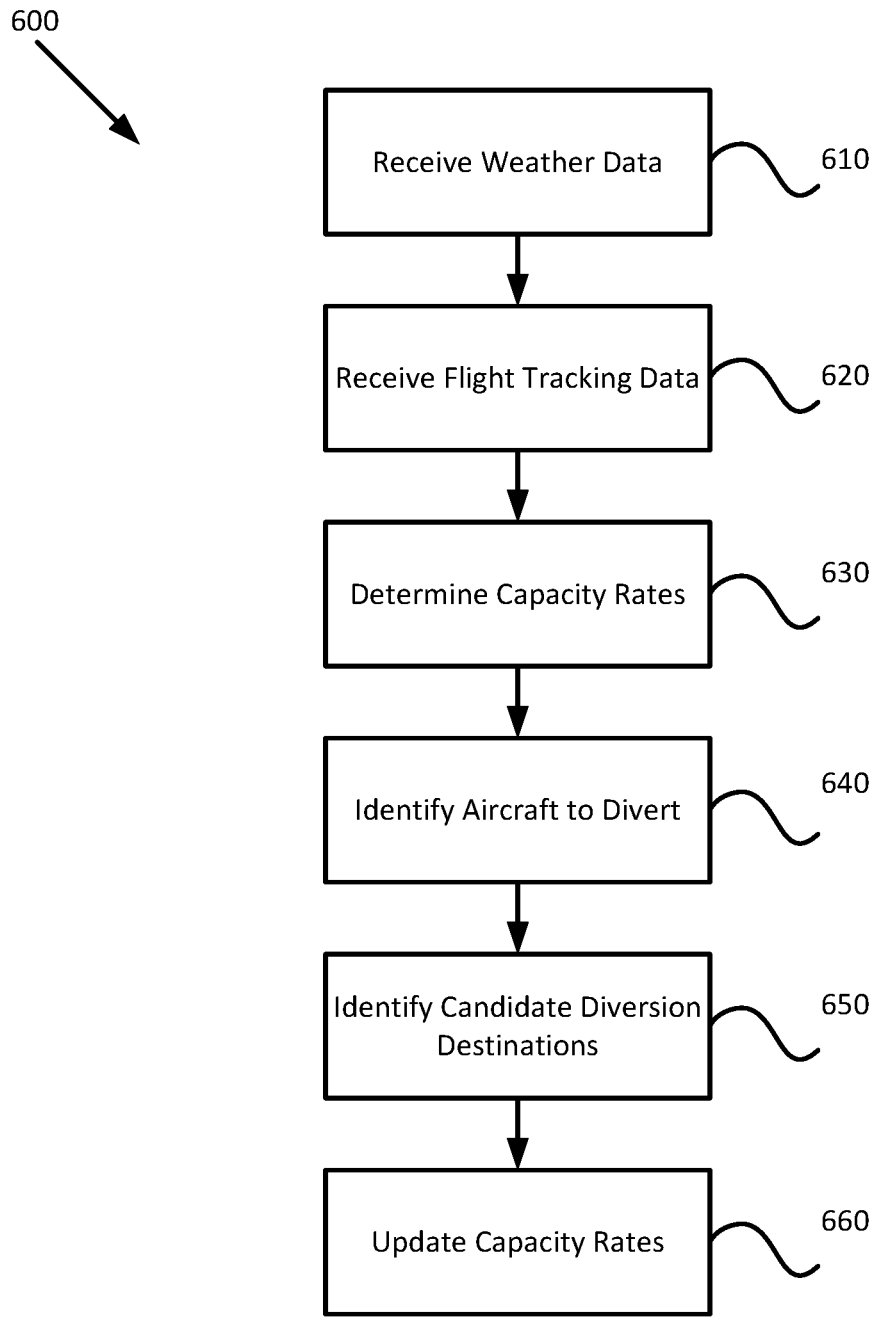
FIG. 6 is a flowchart of a method for predictive flight diversion management, according to aspects of the present disclosure.

FIG. 6 is a flowchart of a method 600 for predictive flight diversion management, according to aspects of the present disclosure.

Method 600 begins with blocks 610, where a diversion management system (such as may be described in regard to FIGS. 1-5), receives weather data for a zone of air traffic control. At block 620, the diversion management system receives flight tracking data for the aircraft travelling in the zone of air traffic control. Although illustrated and discussed in one sequence, blocks 610 and 620 may be performed substantially simultaneously in parallel, or with block 620 prior to block 610 in other aspects. The diversion management system may receive the weather and flight tracking data in real-time (or near real-time) as the data are gathered or may receive the weather and flight tracking data at periodic intervals (e.g., data collected and collated for a time window of s seconds, m minutes, or h hours and received at a corresponding frequency).

In some aspects, the flight tracking data include ADS-B data that specify positional data (e.g., latitude, longitude, altitude, speed, heading) for an aircraft, which may be supplemented with flight data the specify an original flight path (e.g., the original origins, waypoints, and destinations) and deviation information from the original flight path for each individual aircraft indicated in the flight tracking data.

In various aspects, the zone of air traffic control includes global flight operations and the flight tracking data and weather data therefore, but may be localized to a bloc, country, region, or zone around a given airport in other aspects.

At block 630, the diversion management system determines capacity rates for the airports in the zone of air traffic control, based on the flight tracking data. The diversion management system observes which aircraft arrive at which airports from the flight tracking data and determines how those aircraft affect the baseline capacity indicated for each airport.

For example, the diversion management system obtains operating parameters for the airports including a quantity of active runways, a quantity of active terminals, and a quantity of hangar berths present at a given airport and, by observing flight tracking data over a predetermined time period (e.g., the last d days, the last w work days, the last e weekend days, the last h holidays), determines a number of active runways in use at an ETA for a particular aircraft to the given airport compared to the quantity of active runways, a number of active terminals in use at the ETA compared to the quantity of active terminals, and a number of hangar berths in use at the ETA compared to the quantity of hangar berths. The diversion management system may also receive capacity rate data from the airports (e.g., a fixed base operator may indicate that x runways are available at peak capacity or that y runways are available in a given time window). The diversion management system may track several capacity rates for the several airports in the zone of air traffic control, including, but not limited to: runway availability, terminal/gate availability, hangar/maintenance facility availability, refueling availability, hotel availability, ground transportation availability, maintenance crew availability, air crew availability, medical facility/crew availability, and customs officer availability.

At block 640, the diversion management system identifies aircraft to divert. In some aspects, the diversion management system identifies the aircraft based on a manually received diversion events, such as, for example, when a flight crew indicates that a medical issue has occurred aboard an aircraft, and that the aircraft needs to land sooner than originally planned. In other aspects, the diversion management system predicts that an aircraft will be affected by a diversion event (e.g., a developing weather event at the original destination, slower than expected operations at the original destination, a delayed flight cascading to affect incoming flights at the original destination), and generates a diversion trigger that identifies the aircraft and candidate new diversion destinations for that aircraft. The diversion trigger is generated by one or more AI models predicting a diversion event (e.g., the diversion detection module 260 and new destination prediction model 270 discussed in relation to FIG. 2), which the diversion management system uses as a basis for recommending new destinations to various flight dispatchers and air crews.

In some aspects, the diversion management system identifies all of the aircraft that are to be diverted in response to a diversion event and collectively identifies new destinations that those aircraft may be diverted to based on which airports satisfy operator requirements, including, for example: repair services offered, medical services offered, and alternative flights offered by a given aircraft operator. In other aspects, the diversion management system divides the plurality of aircraft to be diverted into prioritized subsets. For example, when aircraft X and Y are diverted due to a weather event, but aircraft Z is diverted due to a medical or maintenance event, the diversion management system may identify airports to divert aircraft Z to before analyzing the diversion candidates for aircraft X and Y due to a higher priority assigned to the diversion event affecting aircraft Z. Aircraft X and Y in this example may be diverted once a new destination has been assigned for aircraft Z in a subsequent iteration of method 600. Accordingly, the diversion management system may iteratively assign aircraft to new destinations as additional weather and flight tracking data are received and as earlier-diverted aircraft are accounted for at the newly assigned destinations for those diverted aircraft.

At block 650, the diversion management system identifies the candidate diversion destinations that produce the least disruption to the air traffic network. The diversion management system uses one or more AI models to identify, based on the predicted weather conditions at a predicted time of arrival for an aircraft at a candidate airport and the predicted capacity rate of the candidate airport at the predicted time of arrival for the given aircraft, which airports can receive a diverted aircraft and the effect of receiving that aircraft on the given airport. The diversion management system analyses the effects of diverting several aircraft to several candidate airports to identify, based on the currently available data, the assignments that result in the lowest total disruption across the air traffic network. By predicting the diversion events earlier, and spreading the aircraft affected by a diversion event among several airports, the diversion management system can reduce the impact of the diversion event on the air traffic network in the zone of aircraft control. In various aspects, the diversion management system identifies the recommended airports to divert an aircraft to by transmitting an alert to a flight dispatcher for the zone of air traffic control that indicates which aircraft are recommended to divert to which new destination airports. In some embodiments, the diversion management system identifies the recommended airports to divert an aircraft to by transmitting an alert to a flight crew on an affected aircraft that identifies the recommended new destination airports for that aircraft.

At block 660, in response to receiving a selection of a given candidate new destination airport for a diverting aircraft, the diversion management system updates the capacity rates for the airports so that any aircraft that are to be diverted, but have not yet selected a new destination, and any aircraft that will be diverted due to future diversion events can be diverted to airports based on the most recent information about resource availability. Method 600 may then iterate again using the new capacity rates to identify new candidate destinations for aircraft to be diverted. Method 600 may also iterate again when new weather data are received (per block 610) or new flight tracking data are received (per block 620).

Figure 7:
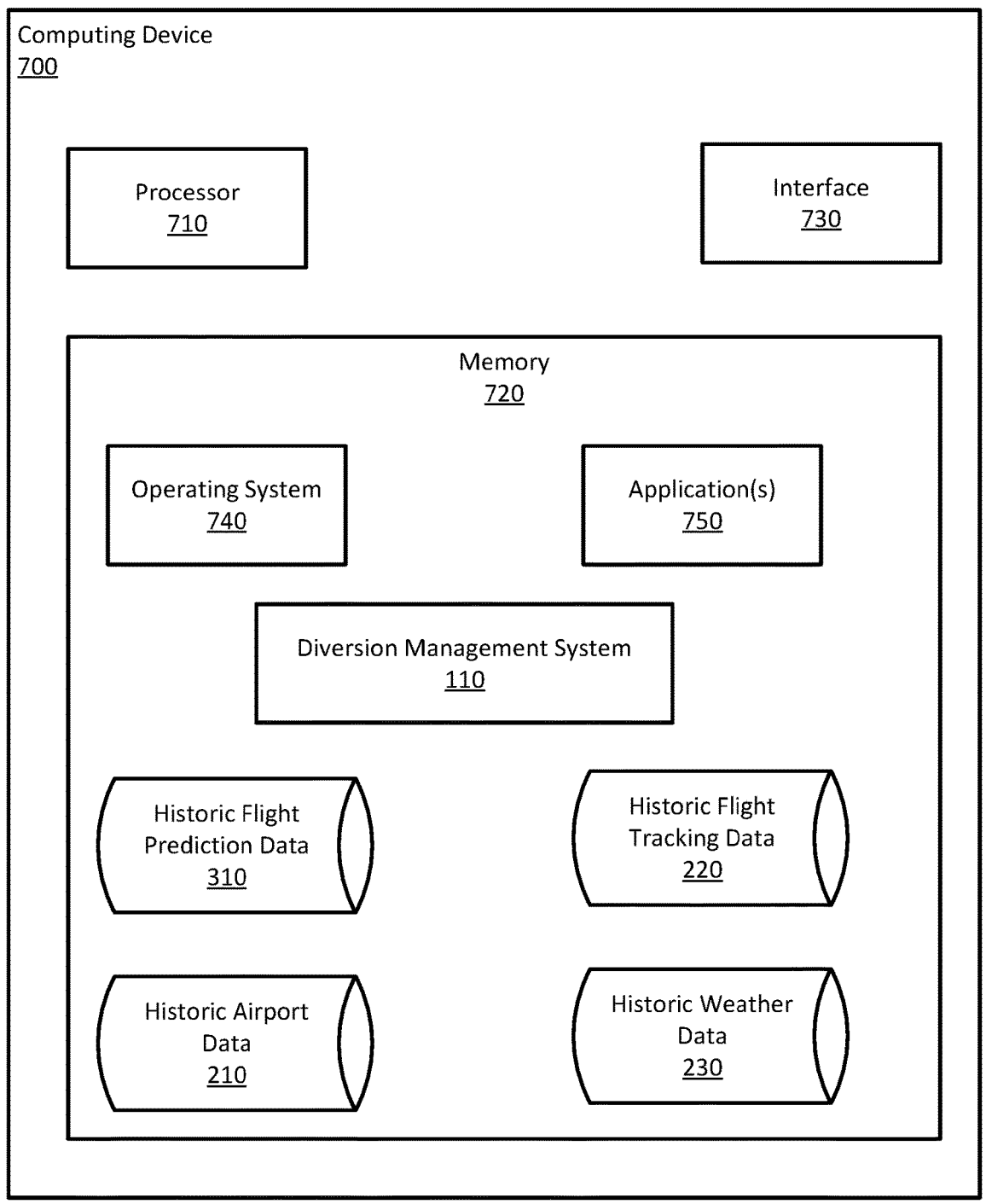
FIG. 7 illustrates example computing components of a computing system as may be used to provide predictive flight diversion management, according to aspects of the present disclosure.

FIG. 7 illustrates example computing components of a computing device 700 or other processing system as may be used to provide predictive flight diversion management as described in the present disclosure.

The computing device 700 includes a processor 710, a memory 720, and an interface 730. The processor 710 and the memory 720 provide computing functionality to run the AI modules to process real-time data and output diversion alerts.

The processor 710, which may be any computer processor capable of performing the functions described herein, executes commands based on inputs received from a user and the data received from the interface 730.

The interface 730 connects the computing device 700 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 730 is used to receive the live data and to output diversion recommendations.

The memory 720 is a memory storage device that generally includes various processor-executable instructions, that when executed by the processor 710, perform the various functions related to predictive flight diversion management discussed herein. The processor-executable instructions may generally be described or organized into various "applications" or "modules" in the memory 720, although alternate implementations may have different functions and/or combinations of functions. The memory 720 also generally includes data structures that store information for use by or output by the various applications or modules. In the present disclosure, the memory 720 includes at least instructions for an operating system 740 and one or more application(s) 750. The memory 720 may be one or more memory devices, such as, for example, Random Access Memory (RAM), Read Only Memory (ROM), flash memory, or any other type of volatile or non-volatile storage medium that includes instructions that the processor 710 may execute.

When the computing device 700 provides the functionality of the diversion management system 110, the memory 720 includes processor executable instructions to provide an application for the diversion management system 110 (and the various AI models and modules included therein) and provide the functionalities described in the present disclosure. In some aspects, the memory 720 includes databases for the historical flight prediction data 310, the historical airport data 210, the historical flight tracking data 220, and the historical weather data 230 for use in training the AI models, but in other aspects the databases are maintained externally from the computing device 700 and are accessed via the interface 730.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF (Radio Frequency), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

receiving weather data for a zone of air traffic control;

receiving flight tracking data for a plurality of aircraft travelling in the zone of air traffic control;

determining capacity rates for a plurality of airports in the zone of air traffic control, based on the flight tracking data; and in response to receiving a diversion trigger from a predictive model, predicting a diversion event by:

identifying, based on the weather data, the flight tracking data, and the capacity rates, a subset of aircraft from the plurality of aircraft that are to be diverted from original destinations in the zone of air traffic control, wherein the subset of aircraft include a first aircraft and a second aircraft with a lower diversion priority than the first aircraft based on a total disruption metric for the zone of air traffic control;

selecting, according to a predictive model and using a disruption risk for the plurality of airports, disruption risks for the subset of aircraft, and a total disruption risk for an air traffic network, new destinations to divert the first aircraft and the second aircraft to, wherein the new destinations comprise for each aircraft of the plurality of aircraft:

a first alternate destination based on the disruption risk for the plurality of airports, a second alternate destination based on disruption risks for the subset of aircraft, and a third alternate destination based on the disruption risk for the air traffic network, and wherein the predictive model identifies a first diversion destination from the new destinations as a most-preferred diversion destination and a second diversion destination from the new destinations as a less-preferred diversion destination for both the first aircraft and the second aircraft;

diverting the first aircraft to the first diversion destination; and diverting the second aircraft to the second diversion destination.

2. The method of claim 1, further comprising:

transmitting an alert to a flight dispatcher for the zone of air traffic control indicating the subset and corresponding candidate new destinations for each aircraft in the subset; and in response to receiving a selection of a given candidate new destination for a given aircraft of the subset, updating the capacity rates for the plurality of airports and removing the given aircraft from the subset.

3. The method of claim 1, wherein the zone of air traffic control includes global flight operations.

4. The method of claim 1, wherein the plurality of airports from which the new destinations are selected comprise a designated subset of the plurality of airports that satisfy operator requirements, including one or more of:
proximity to a current flight route; and
alternative flights offered by a given aircraft operator.

5. The method of claim 1, wherein the new destinations are selected from the plurality of airports based on:
predicted weather conditions at predicted times of arrival for a given aircraft of the subset each of the new destinations; and
a predicted capacity rate for each of the new destinations at an associated predicted time of arrival for the given aircraft.

6. The method of claim 1, wherein determining the capacity rates for the plurality of airports in the zone of air traffic control, based on the flight tracking data, further comprises:
obtaining operating parameters for the plurality of airports, including a quantity of active runways, a quantity of active terminals, and a quantity of hangar berths present at a given airport;
observing flight tracking data over a predetermined time period to determine:
a number of active runways in use at an Estimated Time of Arrival (ETA) for a particular aircraft of the subset to the given airport compared to the quantity of active runways;
a number of active terminals in use at the ETA compared to the quantity of active terminals; and
a number of hangar berths in use at the ETA compared to the quantity of hangar berths.

7. The method of claim 1, wherein the flight tracking data include:
an original flight path, including an original origin and an original destination;
deviation information from the original flight path; and
current location information for an associated aircraft of the plurality of aircraft.

8. The method of claim 1, wherein each aircraft of the subset is iteratively assigned selected candidate new destinations,
wherein the candidate new destinations recommended to each aircraft of the subset are updated as the aircraft of the subset are assigned to the selected candidate new destinations.

9. The method of claim 1, wherein the flight tracking data are Automatic Dependent Surveillance-Broadcast (ADS-B) data.

10. A system, comprising:
a processor; and
a memory storage device including instructions that when executed by the processor configure the processor to:
determine, in real-time, diversion likelihoods for each aircraft of a plurality of aircraft diverting to a new destination airport based on weather data and flight tracking data for the plurality of aircraft;
determine, in real-time, a disruption risk for each airport of a plurality of airports being disrupted by diverting aircraft of the plurality of aircraft to an individual airport based on the weather data, the flight tracking data, airport operating conditions, and the diversion likelihoods;
determine, in real-time, a disruption risk for a total air traffic network comprising the plurality of airports and the plurality of aircraft, using the disruption risk for each airport the weather data, the flight tracking data, airport operating conditions, and the diversion likelihoods; and
output a predefined number of candidate airports,
wherein the predefined number of candidate airports comprise for each aircraft of the plurality of aircraft:
a first alternate destination based on the disruption risk for the plurality of airports,
a second alternate destination based on disruption risks for the plurality of aircraft, and
a third alternate destination based on the disruption risk for the total air traffic network,
wherein a first aircraft and a second aircraft of the plurality of aircraft are both determined to have a first airport as a preferred diversion destination,
wherein the first airport can accommodate one of, but not both of, the first aircraft or the second aircraft,
wherein the first aircraft is provided with the first airport as one of the predefined number of candidate airports and the second aircraft is not provided with the first airport as one of the predefined number of candidate airports based on the first aircraft having a higher diversion priority than the second aircraft based on a total disruption metric for a zone of flight control.

11. The system of claim 10, wherein the instructions when executed by the processor further provide:
determine ETAs for each aircraft diverting each candidate new destination identified based on the weather data and the flight tracking data.

12. The system of claim 10, wherein the instructions when executed by the processor further configure the processor to:
train a diversion detection model to predict when a given aircraft is to be diverted from an original destination based on the weather data, the flight tracking data, and the airport operating conditions; and
train a new destination prediction to identify candidate airports to divert the given aircraft to based on the flight tracking data and airport operating conditions.

13. The system of claim 10, wherein the instructions when executed by the processor further configure the processor to:
transmit an alert to a flight dispatcher associated with a given diverted aircraft that identifies the predefined number of candidate airports, and is further configured to receive a selection of a given candidate airport from the flight dispatcher; and
in response to receiving the selection, update the airport operating conditions based on the selection.

14. The system of claim 10, wherein the instructions when executed by the processor further configure the processor to:
output the predefined number of candidate airports based on a plurality of alternative selection models corresponding in number to the predefined number of candidate airports, and
wherein each alternative selection model is a machine learning model trained to identify one candidate airport with a lowest disruption likelihood using a different prioritization than other alternative selection models of the plurality of alternative selection models.

15. A non-transitory computer readable storage device including instructions that when executed by a processor of a processing system, cause the processing system to perform an operation comprising:
   receiving weather data for a zone of flight control;
   receiving flight tracking data for a plurality of aircraft travelling in the zone of flight control;
   in response to receiving a diversion trigger affecting a first airport:
      identifying, based on the weather data, the flight tracking data, and a capacity rate for the first airport, a first aircraft and a second aircraft from the plurality of aircraft that are originally destined for the first airport are to be diverted;
      determining a plurality of disruption metrics for the first aircraft and the second aircraft based on diversion options, wherein the diversion options comprise for each of the first aircraft and the second aircraft:
         a first alternate destination based on a disruption risk for a plurality of airports in the zone of flight control,
         a second alternate destination based on disruption risks for the first aircraft and the second aircraft, and
         a third alternate destination based on a disruption risk for an air traffic network;
      in response to determining that a predicted capacity rate for a second airport in the zone of flight control, based on the flight tracking data, satisfies a capacity threshold, for accepting only one of the first aircraft and the second aircraft, determining using the plurality of disruption metrics, a total disruption metric for an air traffic network for diverting the other one of the first aircraft and the second aircraft to a third airport in the zone of flight control;
      diverting the first aircraft to the second airport from the first airport and the second aircraft to the third airport when the total disruption metric indicates lower fuel usage for diverting the first aircraft to the second airport and the second aircraft to the third airport than diverting the second aircraft to the second airport and the first aircraft to the third airport;
      updating the flight tracking data to indicate that the first aircraft is diverted from the first airport to the second airport and that the second aircraft is diverted to the third airport; and
      updating the capacity rate for the second airport and the third airport based on the flight tracking data as updated.

16. The computer readable storage device of claim 15, wherein the diversion trigger is received from a predictive model in response to the predictive model predicting a diversion event affecting the first airport based on the weather data and the flight tracking data.

17. The computer readable storage device of claim 15, wherein the diversion trigger is received from an aircraft operator in response to a manually reported mechanical or medical issue on the first aircraft.

18. The computer readable storage device of claim 15, wherein the second airport and the third airport are selected from a subset of airports in the zone of flight control that satisfy operator requirements including one or more of:
   proximity to a current flight route;
   repair services offered;
   medical services offered; and
   alternative flights offered by a given aircraft operator.

19. The computer readable storage device of claim 15, wherein the second airport is selected based on:
   predicted weather conditions at the second airport at a predicted time of arrival for the first aircraft at the second airport; and
   predicted capacity rates of the second airport at the predicted time of arrival for the first aircraft for resources consumed by the first aircraft.

20. The computer readable storage device of claim 15, wherein determining the predicted capacity rate for the second airport, further comprises:
   observing flight tracking data over a predetermined time period to determine:
      a number of active runways in use at an Estimated Time of Arrival (ETA) for the first aircraft to the second airport compared to a quantity of active runways;
      a number of active gates in use at the ETA compared to a quantity of active gates; and
      a number of hangar berths in use at the ETA compared to a quantity of hangar berths.

* * * * *

UNITED STATES PATENT AND TRADEMARK OFFICE
CERTIFICATE OF CORRECTION

PATENT NO. : 11,645,927 B2
APPLICATION NO. : 16/518092
DATED : May 9, 2023
INVENTOR(S) : Anna Meringer et al.

Page 1 of 1

It is certified that error appears in the above-identified patent and that said Letters Patent is hereby corrected as shown below:

In the Claims

In Column 19, Line 12, in Claim 5, after "of the subset" insert -- at --.

Signed and Sealed this
Twenty-third Day of July, 2024

Katherine Kelly Vidal
*Director of the United States Patent and Trademark Office*